May 4, 1965   J. W. ELDRED ETAL   3,181,457
TURRET TYPE ARTICLE STENCILING MACHINE
Filed May 9, 1963   5 Sheets-Sheet 1
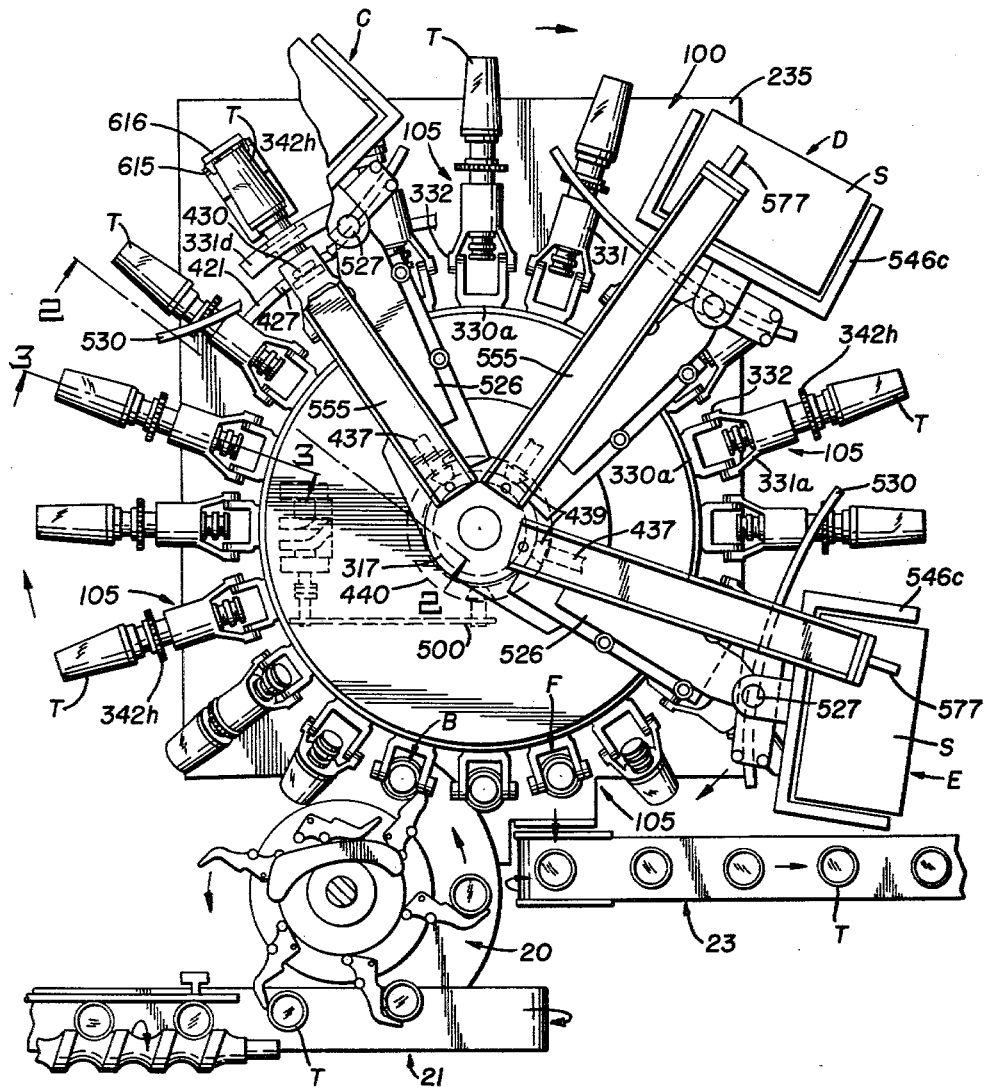
INVENTORS.
JOHN W. ELDRED
JAMES B. LEGG
BY
MAHONEY, MILLER & RAMBO
BY
ATTORNEYS.

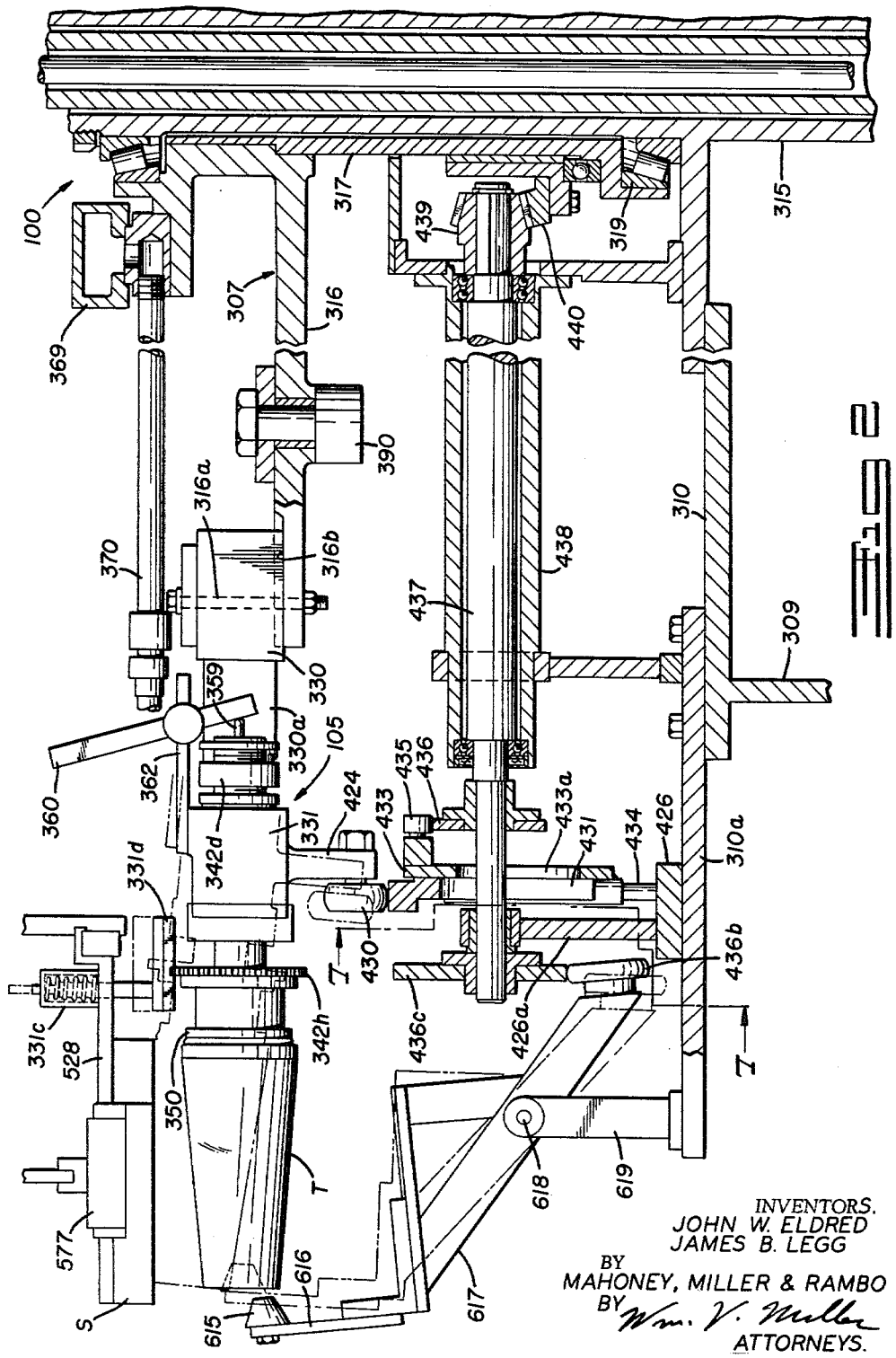

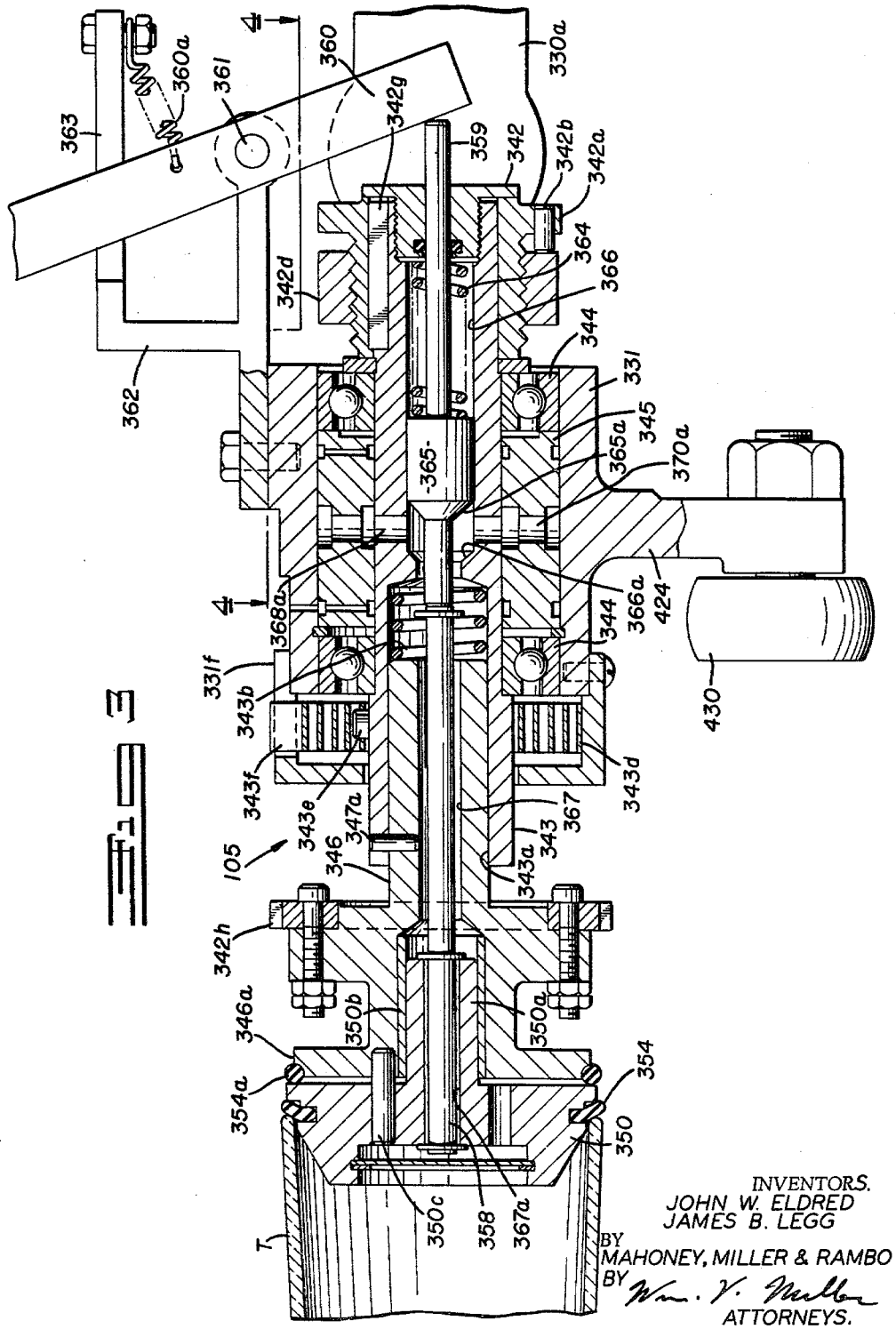

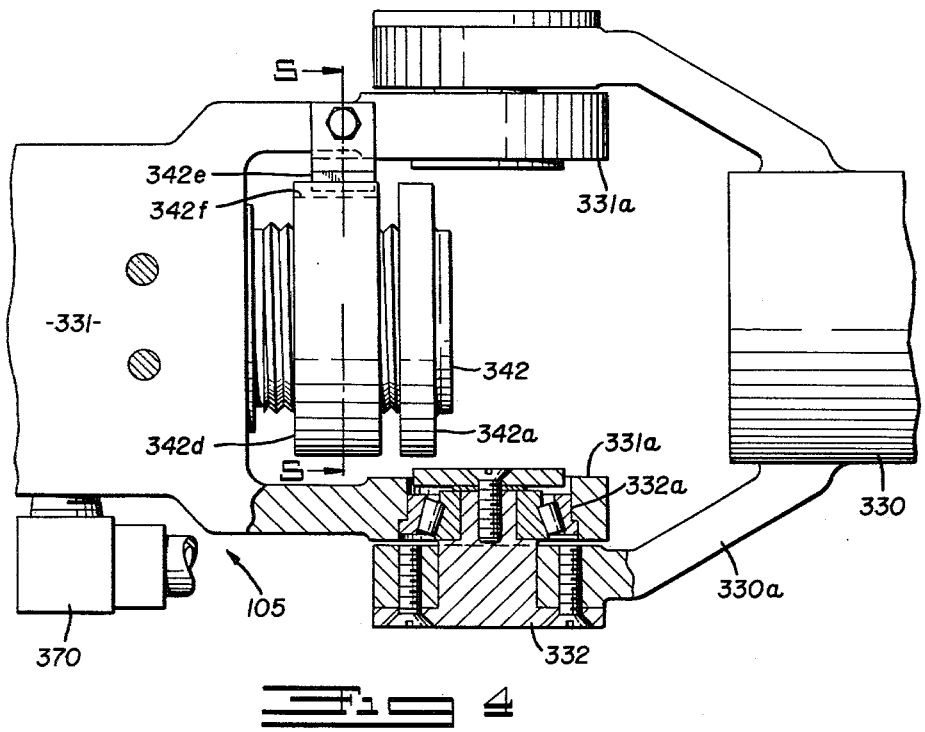
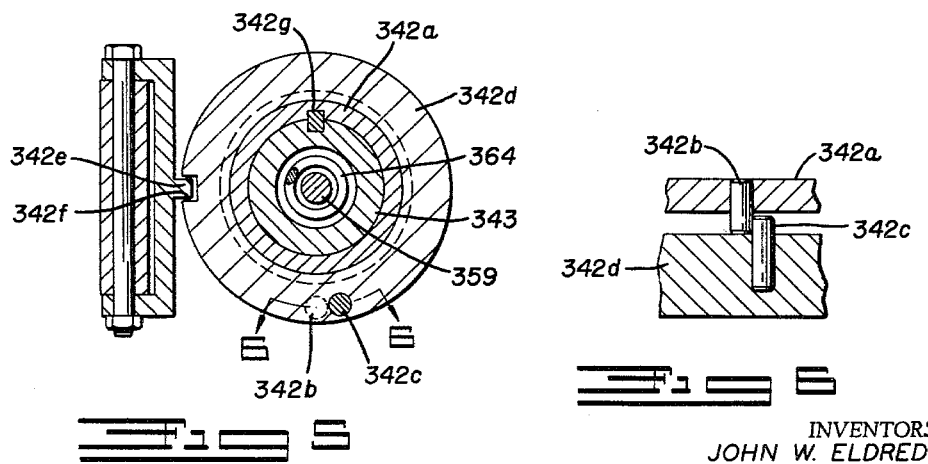

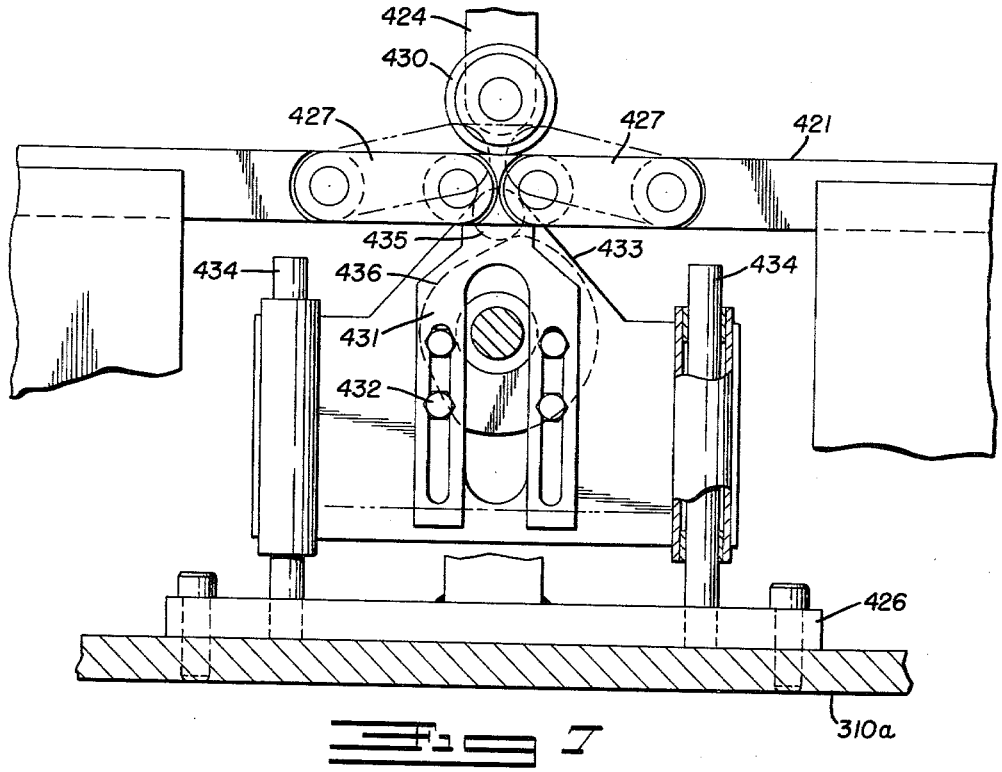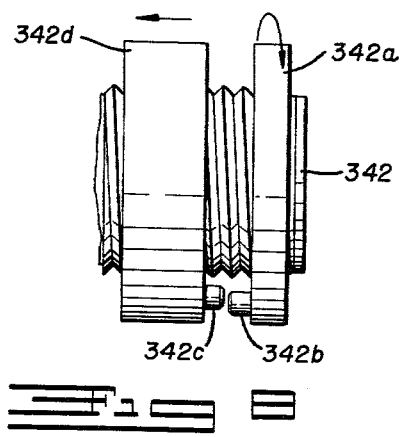

United States Patent Office 3,181,457
Patented May 4, 1965

3,181,457
TURRET TYPE ARTICLE STENCILING MACHINE
John W. Eldred and James B. Legg, Columbus, Ohio, assignors to The Eldred Company, Columbus, Ohio, a corporation of Ohio
Filed May 9, 1963, Ser. No. 279,289
14 Claims. (Cl. 101—124)

Our invention relates to a decorating machine. It has to do, more particularly, with apparatus which employs the silk-screen and squeegee process for applying decorations, in one or more colors, to the surfaces of various articles and especially hollow articles, such as glass tumblers or the like. This invention deals with improvements on the machine disclosed in our copending application Ser. No. 129,455, filed August 4, 1961 which issued as Patent No. 3,096,709 on July 9, 1963.

One of the objects of this invention is to provide a decorating machine of the general type disclosed in our copending application which has improved and greatly simplified article-supporting spindle assemblies.

Another object of this invention is to provide an improved spindle assembly which includes improved, simplified and more positive chuck means for supporting the article, especially during the decorating operations.

Another object of this invention is to provide improved means for lifting the article carried by each spindle assembly into association with the successive decorating screens as it moves successively into association therewith.

Another object of this invention is to provide an improved spindle assembly which is equipped with improved and greatly simplified article-registering means for more effectively registering the successive color design patterns applied to an article.

Still another object of this invention is to provide improved means for lifting the article-supporting chuck at each decorating station to lift the article into association with the cooperating screen.

The improvements constituting this invention are illustrated in a glassware decorating machine shown in the accompanying drawings in which:

FIGURE 1 is a plan view, partly broken away, illustrating generally the decorating machine and means for loading and unloading it.

FIGURE 2 is an enlarged vertical sectional view taken along line 2—2 of FIGURE 1 through the decorating machine.

FIGURE 3 is an enlarged fragmentary vertical sectional view taken along line 3—3 of FIGURE 1 through a spindle assembly of the decorating machine.

FIGURE 4 is an enlarged horizontal sectional view taken along line 4—4 of FIGURE 3 showing the article-registering mechanism.

FIGURE 5 is a transverse sectional view taken along line 5—5 of FIGURE 4 showing the article-registering stop pins.

FIGURE 6 is a horizontal sectional view taken along line 6—6 of FIGURE 5.

FIGURE 7 is an enlarged vertical transverse sectional view taken along line 7—7 of FIGURE 2.

FIGURE 8 is an elevational diagrammatic view illustrating the action of the article-registering stop pins.

The decorating machine embodying the improvements of this invention is of a general structure like that disclosed in our copending application Ser. No. 129,455 and is indicated generally by the numeral 100 in FIGURE 1. The machine may be loaded with articles to be decorated, such as the tapered tumblers T, by means of a continuously rotating loader 20 which is supplied by a continuously moving feed conveyor 21. The decorated articles are removed from the decorating machine 100 by means of a continuously moving discharge conveyor 23. A suitable loading and unloading apparatus of this type is illustrated specifically in our copending application Ser. No. 274,195, filed April 19, 1963.

The decorating machine 100, as disclosed in our copending application Ser. No. 129,455, is of the intermittently indexing turret type and is designed to be loaded with successive tumblers T, with the tumblers in an upright position, between the intervals when it is intermittently indexing. The machine 100 rotates in a clockwise direction, as indicated in FIGURE 1, being driven intermittently to index the angularly spaced spindle assemblies 105 thereof. During this step-by-step rotation, the spindle assemblies 105 are moved from a vertical dependent position at the loading station B to a horizontally or radially extending position as the machine rotates to and past successive decorating stations C, D and E and finally back to a depending position at the unloading station F.

The decorating machine 100 includes the base 235 which rotatably carries the turret 307 that has the improved spindle assemblies 105 mounted thereon in angularly spaced positions. As shown in FIGURE 2, the turret 307 is carried by a supporting frame 309 which is upstanding from the base 235 and which includes a stationary horizontal supporting plate or table 310. The table 310 carries a concentric sleeve or standard 315 which projects above and below the table and which rotatably carries the spindle-supporting table 316 at a level above that of the table 310. The table 316 is part of the turret 307 and is rotatably mounted on the standard 315 by means of a bearing sleeve 317 which surrounds the sleeve 315 and is rotatable relative thereto by means of roller bearings 319. This table 316 is indexed in the manner described in our copending application by cam means which engages the followers 390 that are carried by the table 316 in angularly spaced dependent positions.

Each spindle assembly comprises an inner supporting hinge bracket 330 and an outer section 331 which is hingedly connected to the bracket 330 and is vertically swingable relative thereto about a hinge pivot 332 (FIGURE 4) having a transverse horizontal axis. As previously indicated, the section 331 is adapted to be in a dependent position at the loading and unloading stations B and F (FIGURE 1) and in a horizontal or radially extending position with its axis aligning with the radial horizontal axis of the bracket 330 as it passes the decorating stations C, D and E. The inner end of the bracket 330 is bolted by bolts 316a (FIGURE 2) in a recess 316b at the outer edge of the table 316. It includes an outer yoke portion 330a (FIGURE 4) which receives the inner yoke portion 331a on the inner end of the section 331. Antifriction roller bearings 332a are provided for connecting the yoke portions hingedly together.

The outer spindle section 331 includes a spindle sleeve 343 (FIGURE 3) which is rotatably mounted in a pair of ball bearings 344 disposed in a spindle support sleeve 331 which carries the depending bracket portion 424 that carries the cam following roller 430. An article-supporting chuck assembly is carried by the spindle-supporting sleeve 331 and includes a chuck-supporting sleeve 346 which has its inner end inserted in a socket 343a in the outer end of the spindle sleeve 343 and is removably held therein by a pin and bayonet slot connection 347a. A compression spring 343b is disposed between the inner end of the sleeve 346 and the inner end of the socket 343a and is compressed when the sleeve 346 is inserted in the sleeve socket 343a and is locked therein by the pin and slot connection 347a.

The outer end of the sleeve 346 receives the stem 350a of the chuck head 350 which is of frusto-conical form. This head is of proper size to cooperate with the tumbler T, the edge of the tumbler engaging a sealing ring 354 carried by the head. The outer end of the sleeve 346 is provided with a peripheral flange 346a which is associated with the head 350 and carries an O-ring seal 354a which is adapted to engage the head 350 when an article is mounted on the head. The stem 350a has a bushing 350b positioned between it and its receiving socket in the sleeve 346. A dowel pin 350c is carried by the head 350 and projects inwardly therefrom into a socket in the flange 346a for preventing rotation of the head 350 relative to the flange 346a but permitting relative axial movement. The stem 350a is mounted for sliding movement in its socket and carries a squeegee latch control rod 358 which is fixed axially relative thereto, the rod 358 being axially slidable to a limited extent in the sleeve 346, and projecting through the sleeve and engaging at its inner end the outer end of an axially aligned rod 359. This latter rod 359 projects inwardly through a plug 342 at the inner end of the sleeve 343 and adjacent the hinge axis 332 engages the lower end of the latch lever 360 which is pivoted at 361 to the bracket 362, which is attached to the supporting sleeve 331, projecting upwardly through a slot 363 therein. A tension spring 360a is connected between the lever 360 and the bracket 363 for holding the lower end of the lever and the inner end of the rod 359 in contact. The rod 359 is normally forced outwardly, forcing the rod 358 outwardly, by means of a compression spring 364 surrounding it and engaging a piston valve 365 carried by the rod 359 and axially slidable within a bore 366 in the sleeve 343. The outer end of the piston 365 has a tapered valve surface 365a which is adapted to seat on a tapered seat 366a at the outer end of the bore 366. The bore 366 communicates with a bore 367, around the stem 358, which will connect with the interior of an article T when mounted on the head 350, through a bore 367a extending through the head 350 and its stem 350a. The bore 366 may be connected through ports 368a in the sleeve 343, annular chamber 370a in the sleeve 345, and a conduit 370 (FIGURE 2), including a flexible section, to a vacuum manifold ring 369 as described in our copending application.

When a tumbler T is mounted on the head 350, the rod 358 is pushed inwardly, pushing the rod 359 inwardly and swinging the latch lever 360 to the position shown in FIGURE 3. In this position, as described in our copending application the squeegees 577 will be permitted to engage the respective screens S at the decorating stations C, D and E. As shown in FIGURE 1, each squeegee is carried by an arm 555 and each screen S is carried by a frame 546c. Each frame is carried by an arcuate guide rail 530 and is oscillated about a pivot 527 which is at the outer end of a slide member 526. The inner movement of the rod 359 also unseats the vacuum control valve 365 and permits vacuum force to be applied to the interior of the tumbler T to hold it on the chuck head 350. For tumblers of different sizes, the sleeve 346 and the entire chuck assembly carried thereby may be removed and replaced. If a tumbler is not on the chuck head 350, the valve 365 will be seated and the lever 360 will be swung, by the spring 360a, so that its upper end is inwardly from the position shown in FIGURE 3 and the latching mechanism for the squeegees 577 will present downward movement of the squeegees into association with the screens S as described in our copending application.

Improved registering means is provided according to this invention for insuring proper registry of the designs provided by the successive screens. This registering means includes a gear 342h which is bolted or otherwise secured to the flange 343c on the sleeve 346. This gear meshes with a rack 331d carried on each of the screen frames 546c which are carried by supporting brackets 528 (FIGURE 2) by means of upwardly yielding plunger units 331e. Each rack meshes with the registering gear when the chuck assembly is raised about the pivot 332 into association with the screen. Thus, registration will be effected by a gear that rotates with the article supported on the chuck assembly and which engages a rack on the screen frame to drive the article-supporting chuck as the associated screen is moved about its pivot 527.

A torsion spring 343d (FIGURE 3) normally tends to keep the sleeve 343 in an initial stopped position relative to the sleeve housing 331 which rotatably carries it. This spring 343d is anchored at its inner end to the sleeve 343 by a pin 343e and is anchored at its outer end 343f to a cap 331f which surrounds the sleeve 343 for relative rotation but is fixed to the sleeve 331. Thus, as the sleeve 343 is rotated in one direction in the sleeve housing 331, it winds up the spring 343d and the spring in subsequent unwinding will always return the sleeve 343 to its original stopped or registered position relative to sleeve 331. For successive spindles, the spring 343d will be reversed so that in one spindle clockwise rotation will wind up the spring and in the next counterclockwise rotation will wind it up.

The registering means also includes (FIGURES 3, 5, 6 and 8) a stop member shown as a flanged collar 342a fixed on the inner end of the sleeve 343 and the flange of which carries, in the arrangement shown, an outwardly extending stop portion or pin 342b. This stop pin 342b is adapted to cooperate with an inwardly extending stop portion or pin 342c (FIGURE 6) which is carried by a stop member in the form of an internally threaded collar 342d and which fits on the threaded exterior of the collar 342a, the latter serving as a feed screw member for engaging the inner threaded socket in the member 342d. These stop pins are engaged (FIGURES 5 and 6) by unwinding of the spring 343d to determine the initial position or registering position of the article on the spindle. The collar 342d is prevented from rotating (FIGURE 5) by a tongue 342e which extends inwardly from a bracket fixed to one arm of the yoke 331a and cooperates with a slot 342f in the periphery of the collar. Thus, the collar 342d will move axially on the threaded collar 342a when the sleeve 343 is rotated in its housing sleeve 331 since the collar 342d is prevented from rotating. On successive spindles, the stop assembly including the collars 342a and 342d will be reversed on the inner end of the sleeve 343 in accordance with the reversal of the spring 343d so that in each spindle assembly rotation of the sleeve 343 by the screen rack 331d to wind up the spring 343d will feed the collar 342d in such a direction that the pins 342b and 342c will move out of contact (FIGURE 8). The relative axial movement of the collars will permit the pins to miss after one revolution so that the article can rotate more than one revolution in rolling contact with the screen which will permit an overlap on the article of the design applied thereto. Since the screen oscillates and decoration occurs each time the screen moves over the article in either direction, the article will be driven in opposite directions at each successive screen. This is the reason for providing for reversal of the stop pin assembly and the torsion spring. As soon as the rack 331d is released from the gear 342h, the spring 343d will return the collars 342a and 342d to their original relationship where the stop pins 342b and 342c will contact and will properly position the article carried by that spindle assembly for proper registration with the next screen. The stop collar assembly may be easily positioned on the sleeve 343 in either indicated position by means of the key 342g and the plug 342.

With these improved spindle assemblies, the direction of rotation of each article chuck carried by a particular spindle is the same at all of the decorating stations. This is the result of returning each spindle chuck to its positive registered position as soon as the article carried thereby is lowered away from the cooperating screen and is registered for engagement with the next screen. This return is accomplished by the spring 343d and the registered position is determined by the stop pins 342b and 342c. However, each screen stays in the position it occupied at the extent of its decorating movement in one direction until the next spindle assembly is raised into cooperation therewith. Then when the movement of the screen is reversed, the article is rotated in a reverse direction. For this reason, the torsion spring and stop assembly are correspondingly reversed on successive spindle assemblies.

Improved means is provided according to this invention for lifting each article-supporting spindle at each decorating station to cause the supported article to engage the lower side of the cooperating screen and to operate the registering means. This means is illustrated best in FIGURES 2 and 7. It includes a cam track rail 421, as in the machine disclosed in our copending application, with which the roller 430 on each spindle assembly engages. At each decorating station, under each squeegee support arm 555, the track 421 is provided with a pair of pivoted links 427 (FIGURE 7), each of which has one end pivoted to the main rail section and its other end pivoted to a bracket 433.

This bracket 433 is mounted for vertical sliding movement on a pair of pins 434 which are upstanding from a support plate 426 that is bolted to a support extension 310a of the table 310. Carried by the bracket 433 is a roller bracket 431 which is mounted thereon by a bolt and slot connection 432 for relative vertical adjustment. This bracket carries at its upper side a cam roller 435 in engagement with a rotatable cam 436. Obviously, rotation of the cam 436 will raise and lower the bracket 433 on the pins 434 and this will raise and lower the pivoted links 427 of the cam track so that the roller 430 and its associated spindle assembly will move up and down at proper intervals during rotation of the turret 307 to bring the article into association with the screens S at the successive decorating stations. The cam 436 is of a predetermined shape to raise the track link sections 427 at the proper time.

The cam 436 is fixed on a shaft 437 which is rotatably carried by antifriction bearings in a supporting sleeve 438. This sleeve is supported radially of the table 310 and the shaft 437 projects inwardly through the sleeve where it has a pinion 439 keyed thereon. This pinion meshes with a ring gear 440 which is mounted on the sleeve 317 and is driven continuously independently of the turret 307, for example, by a sprocket and chain drive 500, as shown in FIGURE 1, from the shaft which drives the barrel cam. The shaft 437 projects outwardly through the members 431 and 433, the member 431 being of inverted U-form and the member 433 having a vertical slot 433a through which the shaft extends. The outer end of the shaft is rotatably carried in a bearing support 426a upstanding from the plate 426.

Improved means is provided for supporting the outer end of the tumbler T during each decorating operation and this improved means is shown best in FIGURES 1 and 2. It includes an article-engaging cradle structure comprising a pair of tapered rollers 615 which are carried on laterally spaced radially extending axes by an upstanding arm 616. The axis of the article and its chuck at the decorating station are in the same radial plane as the shaft 437 and the axes of the rollers 615 are equally spaced at opposite sides of this plane. The upstanding arm 616 is carried by a lever bracket 617 which is pivoted on a transverse horizontal pivot 618 to a support 619 carried by the table extension 310a. The inner and lower end of the lever 617 carries a cam-following roller 436b which engages with a rotatable cam 436c. This cam is keyed on the outer end of the shaft 437.

The shaft 437 of the unit at each decorating station which operates the track-lifting and article-supporting units is rotated just as the article reaches the respective decorating stations. Rotation of the cam 436 with the shaft lifts the track sections 427 and, therefore, provides for upward movement of the article into engagement with the lower surface of the screen S at that station. Simultaneously with rotation of the cam 436, the cam 436c is rotated and this will swing the lever 617 so that the rollers 615 will move upwardly into engagement with the outer corner of the tumbler as indicated by broken lines in FIGURE 2. Thus, the article will be firmly supported by the chuck head 350 and the rollers 615 during each decorating operation. The cams 436 and 436c will be of such size and shape and the shaft 437 will be rotated sufficiently at the proper time, to keep the article up against the screen and the rollers 615 in contact with the article during the entire decorating operation.

It will be apparent from the above description that our invention provides improvements over the machine disclosed in our copending application. These improvements, as indicated above, are mainly in the simplification of the spindle assembly and especially the article-registering means associated therewith, and in the means for raising the article-supporting chuck and supporting the outer end of the article at each successive station.

Having thus described this invention, what is claimed is:

1. A decorating machine comprising a rotatable turret, spindles mounted on said turret at angularly spaced intervals and carrying article-supports, a plurality of decorating stations disposed in cooperation with the turret at angularly spaced positions about the axis of the turret, means for rotating the turret to bring articles carried by said spindles successively to the successive decorating stations, each of said stations including a screen support mounted for oscillation and adapted to carry a screen, means at each of said stations for bringing an article into and out of contact with the screen, interengaging means between the screen support and each article support for rotating the article about its axis when in contact with the screen, and means for automatically reversing the direction of rotation of each article carried by an article support upon disengagement thereof with the rotating means on the screen support.

2. A decorating machine comprising a rotatable turret, spindles mounted on said turret at angularly spaced intervals and carrying article-supporting chucks, a plurality of decorating stations disposed in cooperation with the turret at angularly spaced positions about the axis of the turret, means for rotating the turret to bring articles carred by said spindles successively to the successive decorating stations, each of said decorating stations including a screen, means at each of said stations for bringing an article supported on each chuck into and out of contact with the screen, means for moving the screen linearly relative to the article with the article in rolling engagement there with, and means for automatically rotating the article in a reverse direction when the article and screen are moved out of contact, and stop means cooperating with each of said chucks for stopping said reverse rotation at a selected registering position.

3. A decorating machine comprising a rotatable turret, spindles mounted on said turret at angularly spaced intervals and carrying article supports, a support for a decorating screen in cooperation with the turret and adapted to carry a screen for engagement with articles carried by the supports on successive spindles, means for oscillating said screen support relative to an article support moved into cooperation therewith, means between the article support and the screen support adapted to be interengaged when they move into cooperative relationship to rotate the article support upon movement of the screen support relative thereto, automatic means for reversing the rotation of the article support upon disengagement of said rotating means, and stop means cooperating with each of said article supports for stopping said reverse rotation at a selected registering position.

4. A decorating machine according to claim 3 in which said interengaging means comprises a rack carried by the screen support and a gear fixed for rotation with the article support and said stops means comprises relatively rotatable stop members which are in engagement for determining the registering position of the article support.

5. A decorating machine according to claim 4 in which said automatic reversing means comprises a torsion spring connected to said article support which is wound up by the engagement of said rack and said gear.

6. A decorating machine according to claim 5 in which said stop members consist of a stop member rotatable with the article support about its axis and a stop member relative to which the first stop member rotates, said stop members carrying stop portions which extend parallel to said axis toward each other, and means for axially feeding one of said stop members away from the other upon relative rotation by engagement of said gear and rack to gradually bring said stop portions out of engagement, reverse rotation of the stop members by said spring bringing the stop portions back into engagement.

7. A decorating machine according to claim 6 in which said axial feeding means comprises a feed screw member which rotates with one of said stop members and is threaded into the other of said stop members, said stop portions comprising oppositely extending pins on the adjacent relatively rotatable stop members which are disposed equal distances radially from the axis of rotation of the stop members, said stop pins being initially engaged at said registering position by the action of said spring but moving out of engagement upon relative rotation of said stop members which produces axial movement away from each other.

8. A decorating machine according to claim 7 in which the said rack and gear means at successive stations is reversed so as to drive the article holders at successive stations in opposite directions, said stop members at successive stations also being reversed axially.

9. A decorating machine according to claim 3 in which each article support moves beneath the screen support upon rotation of said turret, each of said spindles having a section which carries its article support and which is hinged for vertical swinging movement, means for moving each article support upwardly relative to the screen support to lift the article adapted to be carried by the article support into engagement with the screen adapted to be carried by the screen support, said means comprising a cam track engaged by a cam follower on each spindle, said cam track having a vertically movable section at the decorating station, and cam means for moving said track section vertically, said cam means comprising a rotatable cam mounted for rotation in a vertical plane about a horizontal axis adjacent said track section, and a cam follower carried by said track section.

10. The combination of claim 9 in which said cam follower is carried by a member which is adjustably connected to said track section whereby the vertical position of the follower relative to the track section can be varied.

11. The combination of claim 9 including a cradle for supporting the article when it is in cooperation with the screen at the decorating station, said cradle being carried by a lever supported for vertical swinging movement at the decorating station beneath the screen support, and cam means for swinging the lever to engage the cradle with an article supported beneath the screen, said cam means comprising a rotatable cam mounted for rotation about the same axis as the first cam and engaged by a cam follower on said lever.

12. A decorating machine comprising a turret mounted for rotation about a vertical axis, a plurality of article-supporting spindles carried at angularly spaced positions on said turret, each of said spindles comprising an article-carrying section swingable on said turret between a vertical dependent position and a horizontal radially extended position, means for swinging said sections between said positions, said means including a continuous cam track relative to which the turret rotates and engaged by a cam follower on each of said spindle sections, a decorating station at a predetermined position angularly of the turret and including a horizontally disposed screen support beneath which the radially extended spindle sections are moved, said track at said station having a vertically movable section, cam means for raising said section and comprising a cam member rotatable about the axis of a horizontally disposed shaft, and a cam follower engaging with said cam and carried by said vertically movable track section.

13. The combination of claim 12 including an article supporting cradle for engaging an article carried by the spindle section at the decorating station, said cradle being carried by a lever mounted for vertical swinging movement at the decorating station, a cam member mounted for rotation about said shaft axis, and a cam follower carried by said lever and engaging with said last-named cam member.

14. The combination of claim 13 in which said cam follower is connected with said track section by relatively vertically adjustable means.

References Cited by the Examiner
UNITED STATES PATENTS

| 2,484,671 | 10/49 | Bauman | 101—115 |
| 2,528,489 | 11/50 | Bednash et al. | 74—10.2 X |
| 2,553,085 | 5/51 | Grace | 101—124 X |
| 2,837,925 | 6/58 | Rowley et al. | 74—10.2 |
| 2,939,325 | 6/60 | Verhoeff | 74—10.2 |
| 2,951,440 | 9/60 | Dubuit | 101—126 |

WILLIAM B. PENN, *Primary Examiner.*